United States Patent
Le Bris et al.

[15] 3,671,552
[45] June 20, 1972

[54] PROCESS FOR THE PREPARATION OF QUINONES AND HYDROQUINONES

[72] Inventors: Louis Le Bris; Daniel Michelet; Michel Rakoutz, all of Lyon, France

[73] Assignee: Rhone-Poulenc S.A., Paris, France

[22] Filed: July 2, 1970

[21] Appl. No.: 52,071

[30] Foreign Application Priority Data
July 4, 1969 France............................6922816

[52] U.S. Cl. ................260/369, 260/396 R, 260/619 F, 260/621 R, 260/623 R
[51] Int. Cl. ................C07c 49/64, C07c 49/66, C07c 49/68
[58] Field of Search................260/396, 619 F, 621 R, 623 R, 260/369

[56] References Cited

UNITED STATES PATENTS 3,213,114   10/1965   Braxton, Jr. et al. ...................260/396
3,306,874   2/1967   Hay .......................................260/396

*Primary Examiner*—Lorraine A. Weinberger
*Assistant Examiner*—Vivian Garner
*Attorney*—Stevens, Davis, Miller & Mosher

[57] ABSTRACT

Quinones of the formula:

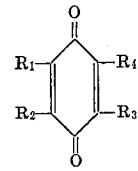

in which the symbols $R_1$, $R_2$, $R_3$ and $R_4$ represent hydrogen, halogen, or hydrocarbon radicals, not more than three of the symbols representing hydrogen, are obtained by oxidation of a phenol of the formula:

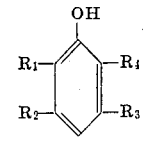

in the presence of thallic cations in an aqueous acid medium optionally containing an inert organic solvent.

13 Claims, No Drawings

PROCESS FOR THE PREPARATION OF QUINONES AND HYDROQUINONES

The present invention relates to a new process for the preparation of quinones from phenols.

Various processes are known for the preparation of quinones by oxidation of phenols. Teuber et al in U.S. Pat. No. 2,782,210 describe a process using nitrosodisulphonates as the oxidizing agent whereas Chambers et al., J. Chem. Soc., 1959 p. 1,804–7, have used a mixture of trifluoracetic acid and hydrogen peroxide. Boscott, Chemistry & Industry, 1955, p. 201–202, has also disclosed that phenols can be oxidized to quinones using nitrites in an acid medium.

All of these processes suffer from the disadvantage that the oxidizing agents employed cannot be regenerated easily.

A process for oxidizing phenols to quinones has now been found in which the oxidizing agent can easily be regenerated after use. Thus, the present invention provides a process for the preparation of quinones of the general formula:

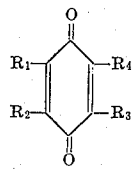

I in which each of the symbols $R_1$, $R_2$, $R_3$ and $R_4$, which may be the same or different, represents a hydrogen atom or a halogen atom or a hydrocarbon radical which may carry substituents, with the proviso that not more than three of the symbols $R_1$, $R_2$, $R_3$ and $R_4$ may represent hydrogen atoms; or the symbols $R_1$ and $R_2$, and/or $R_3$ and $R_4$, together represent a divalent radical which, in conjunction with the carbon atoms of the quinone nucleus to which it is attached, forms an aromatic ring fused on one side to the quinone nucleus, which process comprises treating a phenol of the general formula:

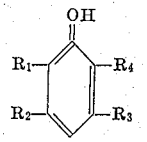

II in which the symbols $R_1$, $R_2$, $R_3$ and $R_4$ are as hereinbefore defined, with thallic cations in the presence of water and an acid.

Monovalent thallium, which results from reduction of the trivalent thallium during the process of the invention, can be regenerated to trivalent thallium by any known method, for example that described in the specification of U.S. Pat. No. 3,486,992 granted to A. H. Frye, assignor to Cincinnatti Milling Machine Co., on an application filed on Feb. 15, 1967.

The hydrocarbon radicals which the symbols R may represent are aliphatic, cycloaliphatic, aryl or araliphatic radicals, particularly radicals having one to 10 carbon atoms such as methyl, ethyl, propyl, n-butyl, isobutyl, phenyl and tolyl groups. An example of a divalent radical which $R_1$ and $R_2$, or $R_3$ and $R_4$, may represent is buta-1,3-dienylene, i.e. —CH = CH—CH =CH—, in which case the corresponding phenol is α-naphthol.

The thallic cations are obtained from compounds which liberate thallic cations in aqueous acid media, for example, thallic oxide and hydroxide and thallic salts such as the sulphate, nitrate, chloride, bromide, fluoborate, borate, perchlorate, phosphate, formate, acetate, oxalate, and alkyl- and aryl-sulphonates preferably possessing fewer than 10 carbon atoms.

The acidity of the reaction medium should be such that the apparent pH of the aqueous phase (measured with a pH meter using a glass electrode and a normal calomel electrode) is less than 7, preferably less than 3. This preferred value is achieved in practice if all of the thallic compound present in the medium is in the dissolved state. (By "aqueous phase" is meant the liquid phase forming the reaction medium and containing the major part of the water present in the said medium).

Suitable acids which can be used to maintain the acidity of the reaction medium include sulphuric, nitric, fluoboric, boric, perchloric, phosphoric, formic, acetic, propionic, oxalic and methanesulphonic acids. Hydrochloric acid can also be used, but preferably in an amount such that the molar ratio Cl/Tl/(III) in the medium does not exceed 3.

The ratio of the number of mols of thallic cations used to the number of mols of the phenol of formula II is usually between 0.05 and 2 and preferably 0.5 to 1.2, whilst the amount of water used is normally 1 to 99 percent by weight of the reaction mixture, preferably 50 to 95 percent.

The reaction temperature for the oxidation is usually between 5° and 150° C., preferably between 20° and 80° C.

As the starting phenol is not always even partially soluble in the aqueous phase, it is frequently advantageous to carry out the reaction in the presence of a solvent for the phenol (hereafter described by the word "co-solvent") which is inert towards the thallic cation. Co-solvents which can be used include, for example, amides such as formamide, dimethylformamide and dimethylacetamide; saturated aliphatic and saturated cycloaliphatic hydrocarbons containing five to 15 carbon atoms; aromatic and alkylaromatic hydrocarbons containing six to 15 carbon atoms; nitriles such as acetonitrile and propionitrile; aliphatic organic acids containing up to 10 carbon atoms such as acetic acid; ketones containing up to 10 carbon atoms such as acetone, butanone, the pentanones, methyl isobutyl ketone and the hexanones; cyclic and noncyclic ethers such as dioxan, diethyl ether and diisopropyl ether. The amount of co-solvent used, for example acetonitrile, acetone, methyl isobutyl ketone or acetic acid, depends on its nature.

Depending largely on the mutual solubility of the co-solvent and water, in some cases the reaction will be carried out in a homogeneous medium (one liquid phase) and in others in a heterogeneous medium (two liquid phases). When the co-solvent for the phenol and the resulting quinone is immiscible with water, it is possible, after separation of the reaction medium into two layers, to extract the quinone at the rate at which it is formed and hence continuous operation of the process is possible. Benzene, toluene, methyl isobutyl ketone and the ethers are suitable such co-solvents.

The quinones obtained by the process of the present invention can be used for the preparation of hydroquinones (quinols) by methods known per se for the reduction of quinones to quinols, for example by means of zinc powder (The term "-methods known per se" as used herein means methods hitherto practiced or described in the literature). The quinones and hydroquinones together form redox systems which are useful, for example, in the photographic industry and in the preparation of polymerization initiator systems.

It is also possible to use the quinones as synthesis intermediates; for example, trimethyl-p-benzoquinone can be used in the preparation of vitamin E.

The following Examples illustrate the invention. The indicated percentages are by weight.

EXAMPLE 1

50 g. of α-naphthol, 100 cc. of acetonitrile and 100 cc. of water in a 3,000 cc. flask are heated to 40° C. with stirring. 2 Liters of 5 percent aqueous sulphuric acid containing 166 g. of thallic sulphate are added gradually over the course of 3 hours, and the temperature is maintained at 40° C. for a further 30 minutes. The thallic salt remains dissolved in the reaction medium.

The quinone formed is extracted with 3,350 cc. of diethyl ether, and after evaporation of the ether and recrystallization of the residue from ethanol 46.5 g. of naphthoquinone are obtained.

EXAMPLE 2

3.45 g. of $Tl_2O_3$ are dissolved in 100 cc. of 5 percent aqueous nitric acid. The resulting solution of thallic nitrate is gradually introduced, over the course of 10 minutes, into a 500 cc. flask containing 20 cc. of acetone and 1 g. of 2,3,5-trimethylphenol at 40° C. The temperature is maintained for a further 30 minutes. The thallic salt remains dissolved during the reaction.

0.625 g. of trimethyl-p-benzoquinone are thus obtained.

EXAMPLE 3

460 cc. of 5 percent aqueous sulphuric acid containing 37.6 g. of thallic sulphate are gradually added, with stirring, over the course of 30 minutes to 10 g. of 2,3,5-trimethylphenol and 250 cc. of methyl isobutyl ketone in a 2,000 cc. flask at 50° C. Stirring at this temperature is maintained for a further 30 minutes.

The reaction mixture is in the form of an emulsion; however, the thallic salt remains in solution.

After separation of the two phases, 7.27 g. of trimethyl-p-benzoquinone are found in the organic phase and 0.15 g. of trimethyl-p-benzoquinone in the aqueous phase.

EXAMPLE 4

880 cc. of 5 percent aqueous sulphuric acid, containing 35.2 g. of thallic sulphate, are added gradually over the course of 2 hours 30 minutes to a solution of 10.012 g. of 2,3,6-trimethylphenol in 20 cc. of acetone in a 3,000 cc. flask at 62° C. The temperature is maintained at 62° C. for a further hour. The thallic salt remains dissolved during the reaction.

5 g. of zinc powder are then added, and the reaction mixture is stirred at ambient temperature for 15 minutes. 9.43 g. of trimethylhydroquinone are obtained. The yield relative to the thallium is 89 percent. The yield relative to the phenol consumed is 89 percent.

EXAMPLE 5

A two-phase mixture containing 2 liters of 10 percent sulphuric acid, 38.3 g. of thallic sulphate and 7.5 g. of 2,3,5-trimethylphenol is heated at 45° C. for 1 hour. The thallic salt remains in solution.

An amount of trimethyl-p-benzoquinone equal to 6.35 g. is found in the reaction medium by polarography, representing a yield of 77 percent relative to the thallium introduced.

5 g. of zinc are added, and the reaction mixture is stirred at ambient temperature for 15 minutes, then extracted 5 times with 500 cc. of diethyl ether. Evaporation of the ethereal solution and recrystallization of the residue from chloroform yields 5 g. of trimethylhydroquinone.

EXAMPLE 6

2.5 g. of 2,3,6-trimethylphenol, 500 cc. of 10 percent sulphuric acid and 12.4 g. of thallic sulphate are introduced into a 1-liter flask. The reaction mixture is heated to about 45° C. (two phases at this temperature) and maintained at that temperature for 3 hours. The thallic salt remains dissolved during the reaction.

2.58 g. of trimethyl-p-benzoguinone are obtained, representing a yield of 96.5 percent relative to the thallium and 93.5 percent relative to the phenol introduced.

EXAMPLE 7

0.5 g. of trimethyl-p-benzoguinone 2,3,5-trimethylphenol, 50 cc. of 10 percent sulphuric acid, 1.4 g. of thallic sulphate and 20 cc. of acetonitrile in a 150 cc. flask are heated to 50° C. and maintained at that temperature for 2 hours during which time the thallic salt remains dissolved.

0.26 g. of trimethyl-p-benzoguinone are obtained, representing a yield of 97.5 percent relative to the thallium introduced.

EXAMPLE 8

50 cc. of 10 percent sulphuric acid, 1.36 g. of thallic sulphate, 0.261 g. of 2,3,5-trimethylphenol and 50 cc. of 20 percent aqueous acetic acid in a 150 cc. flask are heated to 80° C. and maintained at that temperature for 1 hour. The thallic salt remains dissolved during the reaction. 0.259 g. of trimethyl-p-benzoquinone are obtained, representing a yield of 90 percent relative to the phenol introduced.

EXAMPLE 9

A mixture of 50 cc. of 10 percent sulphuric acid, 1.275 g. of thallic sulphate and 0.488 g. of 2,3,5-trimethylphenol, made up to a total volume of 100 cc. with water, is heated at 95° C. for 2 hours in a 150 cc. flask. The thallic salt remains dissolved during the reaction. 0.24 g. of trimethyl-p-benzoquinone are obtained, representing a yield of 88 percent relative to the thallium introduced.

EXAMPLE 10

60 cc. of 10% sulphuric acid, 1.36 g. of thallic sulphate, 0.2382 g. of 3,5-dimethylphenol and 50 cc. of acetonitrile in a 150 cc. flask are heated to 50° C. and maintained at that temperature for 30 minutes. The thallic salt remains dissolved. 0.194 g. of 3,5-dimethyl-p-benzoquinone are obtained, representing a yield of 73 percent relative to the thallium introduced.

EXAMPLE 11

500 cc. of 10 percent sulphuric acid, 11.05 g. of thallic sulphate and 1.95 g. of 2,5-dimethylphenol in a 1-liter flask are heated to 75° C. and maintained at that temperature for 2 hours. The thallic salt remains dissolved during the reaction. 0.205 g. of 2,5-dimethyl-p-benzoquinone are obtained, representing a yield of 95 percent relative to the thallium.

EXAMPLE 12

0.2359 g. of 2,5-dimethylphenol, 50 cc. of 10 percent sulphuric acid, 1.36 g. of thallic sulphate and 50 cc. of acetonitrile in a 150 cc. flask are heated to 50° C. and maintained at that temperature for 30 minutes. The thallic salt remains dissolved during the reaction. 0.238 g. of 2,5-dimethyl-p-benzoquinone are obtained, representing a yield of 89 percent relative to the thallium introduced.

EXAMPLE 13

50 cc. of 10 percent sulphuric acid, 1.275 g. of thallic sulphate and 0.24 g. of 2,6-dimethylphenol in a 150 cc. flask are heated to 90° C. and maintained at that temperature for 3 hours. The thallic salt remains dissolved during the reaction. There is obtained 0.223 g. of 2,6-dimethyl-p-benzoquinone, representing a yield of 89.5 percent relative to the thallium introduced.

EXAMPLE 14

50 cc. of 10 percent sulphuric acid, 1.275 g. of thallic sulphate and 0.2158 g. of m-cresol in a 150 cc. flask are heated to 75° C. and maintained at that temperature for 3 hours. The thallic salt remains dissolved during the reaction. 0.053 g. of 2-methyl-p-benzo-quinone are obtained, representing a yield of 24 percent relative to the thallium introduced.

EXAMPLE 15

Example 13 is repeated, replacing the dimethylphenol by 0.4 g. of o-cresol to yield 0.141 g. of 2-methyl-p-benzoquinone, representing a yield of 63 percent relative to the thallium introduced.

In Examples 7 to 15, the reaction mixture contains only one phase at the reaction temperature

EXAMPLE 16

Example 14 is repeated but replacing the m-cresol by 0.425 g. of o-phenylphenol. Although the mixture consists of two phases at 75° C., the thallic salt remains in solution during the reaction.

0.252 g. of 2-phenyl-p-benzoquinone are obtained, representing a yield of 75 percent relative to the thallium introduced.

EXAMPLE 17

Example 13 is repeated but replacing the dimethylphenol by 0.4 g. of o-chlorophenol. The reaction mixture is homogeneous at 90° C.

0.108 g. of 2-chloro-p-benzoquinone are obtained, representing a yield of 41 percent relative to the thallium introduced.

EXAMPLE 18

A mixture of 3.09 g. of 2,3,5-trimethylphenol, 10.01 g. of $Tl_2O_3$ and 300 cc. of 10 percent sulphuric acid in a 500 cc. flask is stirred at 40° C. for 30 minutes. (There are two phases at that temperature). It is then heated to 70° C. for 1 hour, at which temperature there is only one phase; the thallic oxide dissolves gradually during the reaction. 1.64 g. of trimethyl-p-benzoquinone are obtained, representing a yield of 50 percent relative to the thallium introduced.

EXAMPLE 19

100 cc. of 10 percent sulphuric acid, 0.94 g. of thallic sulphate and 0.384 g. of o-isobutylphenol in a 150 cc. flask are heated to 95° C. and that temperature maintained for 2 hours. The thallic salt remains in solution.

0.038 g. of isobutyl-p-benzoquinone are obtained, representing a yield of 17 percent relative to the thallium introduced.

We claim:

1. Process for the preparation of a quinone selected from the group consisting of quinones of the formulas:

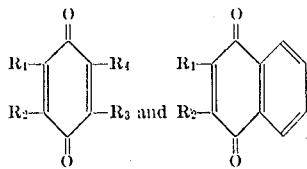

in which each of the symbols $R_1$, $R_2$, $R_3$ and $R_4$ represents hydrogen, halogen or a hydrocarbon radical, with the proviso that not more than three of the symbols $R_1$, $R_2$, $R_3$ and $R_4$ represent hydrogen atoms, which process comprises treating a phenol selected from the group consisting of phenols of the general formulas:

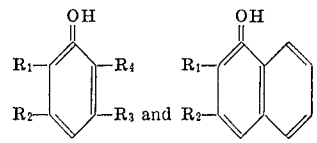

in which the symbols $R_1$, $R_2$, $R_3$ and $R_4$ are as hereinbefore defined, with thallic cations in the presence of water and an acid which will dissolve a thallic compound to give a solution containing thallic ions.

2. Process according to claim 1 in which the thallic cations are derived from a compound selected from the group consisting of thallic oxide, hydroxide, sulphate, nitrate, chloride, bromide, fluoborate, borate, perchlorate, phosphate, formate, acetate, oxalate, thallic alkylsulphonates containing up to 10 carbon atoms, and thallic arylsulphonates containing up to 10 carbon atoms.

3. Process according to claim 1 wherein the acid is selected from the group consisting of sulphuric, nitric, fluoboric, boric, perchloric, phosphoric, formic, acetic, propionic, oxalic and methane-sulphonic acid.

4. Process according to claim 1 wherein the acid is hydrochloric acid, the molar ratio of chloride ion to thallic ion not exceeding 3.

5. Process according to claim 1 in which the pH of the aqueous phase is less than 3.

6. Process according to claim 1 in which the molar ratio of thallic ions to the phenol present is 0.5 to 1.2

7. Process according to claim 1 in which water constitutes 50 to 95 percent of the weight of the reaction medium.

8. Process according to claim 1 in which the reaction medium also contains an organic solvent for the phenol which is inert towards the thallic cation selected from amides, saturated aliphatic and saturated cycloaliphatic hydrocarbons containing five to 15 carbon atoms, aromatic and alkylaromatic hydrocarbons containing six to 15 carbon atoms, nitriles, aliphatic carboxylic acids containing up to 10 carbon atoms, ketones and cyclic and non-cyclic ethers.

9. Process according to claim 8 in which the solvent is selected from the group consisting of acetonitrile, acetone, methyl isobutyl ketone and acetic acid.

10. Process according to claim 1 in which the temperature of reaction is 20° to 100°.

11. Process according to claim 1 in which at least one of the symbols $R_1$, $R_2$, $R_3$ and $R_4$ represents an aliphatic, cycloaliphatic, aryl or araliphatic radical containing one to 10 carbon atoms.

12. Process according to claim 1 in which at least one of the symbols $R_1$, $R_2$, $R_3$ and $R_4$ represents methyl, ethyl, propyl, n-butyl, isobutyl, phenyl, tolyl or chlorine, or the symbols $R_1$ and $R_2$ together represent buta-1,3-dienylene.

13. A process for the preparation of a quinol wherein a phenol is converted to a quinone by the process claimed in claim 1 and the resulting quinone is reduced to a quinol by means of zinc powder.

* * * * *